(12) United States Patent
Nakano

(10) Patent No.: US 9,215,371 B2
(45) Date of Patent: Dec. 15, 2015

(54) IMAGING APPARATUS AND IMAGING METHOD

(75) Inventor: Akira Nakano, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 512 days.

(21) Appl. No.: 13/365,421

(22) Filed: Feb. 3, 2012

(65) Prior Publication Data

US 2012/0200762 A1    Aug. 9, 2012

(30) Foreign Application Priority Data

Feb. 8, 2011   (JP) ................ 2011-024963

(51) Int. Cl.
*H04N 5/232*   (2006.01)
*H04N 5/225*   (2006.01)

(52) U.S. Cl.
CPC ................. *H04N 5/23241* (2013.01)

(58) Field of Classification Search
CPC ....... G06F 3/017; G06F 1/1694; G06F 3/013; G06F 3/1446; H04N 19/176; H04N 5/772; H04N 19/46; H04N 1/00824
USPC ................. 348/208.3, 333.13, 372
See application file for complete search history.

(56) References Cited

U.S. PATENT DOCUMENTS

| 6,822,683 | B1 * | 11/2004 | Torikai ................ 348/333.13 |
| 2004/0201772 | A1 * | 10/2004 | Kobayashi ................ 348/372 |

FOREIGN PATENT DOCUMENTS

| JP | 2006-162974 | 6/2006 |
| JP | 2009-65248 | 3/2009 |
| JP | 2009-89371 | 4/2009 |
| JP | 4328697 | 6/2009 |
| JP | 2009-200702 | 9/2009 |
| JP | 2009-246424 | 10/2009 |

OTHER PUBLICATIONS

Office Action issued Nov. 5, 2014 in Japanese Patent Application No. 2011-024963.

* cited by examiner

*Primary Examiner* — Twyler Haskins
*Assistant Examiner* — Carramah J Quiett
(74) *Attorney, Agent, or Firm* — Oblon, McClelland, Maier & Neustadt, L.L.P.

(57) ABSTRACT

An imaging apparatus includes an image sensor; an image obtainer that obtains a plurality of images from the image sensor; a posture detector that obtains posture information of the imaging apparatus; a posture information accumulating buffer that accumulates the posture information obtained by the posture detector; and a power saving mode setter that activates and deactivates a power saving mode in which power consumption is suppressed, wherein the power saving mode setter determines to activate and deactivate the power saving mode based on the accumulated posture information in the posture information accumulating buffer.

9 Claims, 5 Drawing Sheets

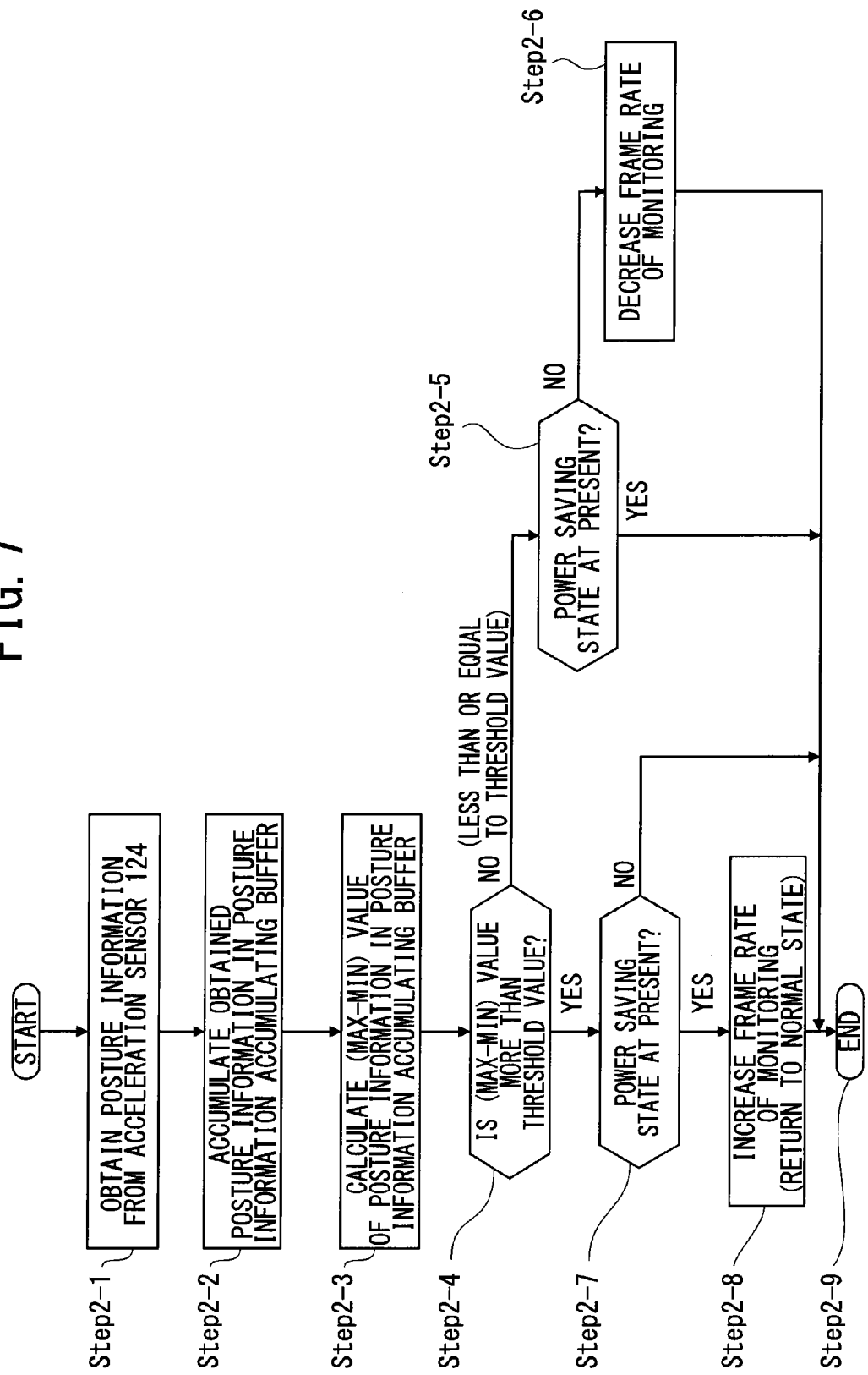

IMAGING APPARATUS AND IMAGING METHOD

CROSS-REFERENCE TO RELATED APPLICATIONS

The present application is based on and claims priority from Japanese Patent Application number 2011-024963, filed Feb. 8, 2011, the disclosure of which is hereby incorporated by reference herein its entirety.

BACKGROUND

The present invention relates to an imaging apparatus having a posture detector and a power saving function, an imaging method, and a program to execute the imaging method.

An imaging apparatus such as a digital camera or the like that records a digital image by an image sensor such as a CCD (Charge-Coupled Device) or a CMOS (Complementary Metal Oxide Semiconductor) has a display device such as an LCD or a viewfinder that displays an image of a photographic subject. And the imaging apparatus displays an image of an object to be imaged (photographic subject) or an image recorded in a memory (recording medium), which is recognized visually by a user.

Many of imaging apparatuses having such a display device have an auto power off function, which turns off the power of the imaging apparatus, to avoid wasteful power consumption, in a case where the imaging apparatus is not operated for a certain time (generally, for about a few minutes).

Thus, wasteful power consumption is suppressed by turning off the power of the imaging apparatus while the imaging apparatus is not used by the user.

However, in a case of imaging after the power of the imaging apparatus is turned off by the auto power off function, it is necessary to turn on the power of the imaging apparatus again and perform a setting for imaging, and therefore, there is a possibility of losing a chance for imaging if the auto power off function is frequently operated.

On the other hand, there is an imaging apparatus having a power saving function that is controlled by the posture detector such that in a case where a posture of the imaging apparatus is not changed, brightness of an LCD or a viewfinder is decreased, or a power saving state where nothing is displayed is set, and in a case where the posture of the imaging apparatus in the power saving state is changed, display of the LCD or the viewfinder is returned from brightness of display in the power saving state to brightness of display in a normal state.

It is possible to decrease wasteful consumption of a battery by the above-described power saving function, because the power consumption of the LCD or the viewfinder is large.

In the above power saving function, a condition for determination of on/off of the power saving function is determined by a threshold value that determines a duration for obtaining posture information and detection of movement by the posture detector.

At this time, in a case where the duration for obtaining posture information is short, the response speed with respect to a change of posture is fast. However, though response with respect to an existence or non-existence of the change of posture is fast, this excessive response with respect to the change of posture causes repeat of the power saving state and the normal state, and therefore it is difficult to see the display of the LCD or the viewfinder. Additionally, it is difficult to differentiate a slow posture change and an output noise from the posture detector, and there is a possibility of mistaking determination of power saving.

On the contrary, in a case where the duration for obtaining posture information is long, a difference value from data obtained immediately before becomes large, therefore, it is easy to differentiate the change of posture and the output noise from the posture detector (sensor), and it is difficult for the repeat of the power saving state and the normal state to occur alternately, because the duration for movement determination is long. However, in a case where there is a drastic change of the posture of the imaging apparatus, even though it is desired to return from the power saving state to the normal state, returning from the power saving state to the normal state is slow, and there is a problem such that a user has to operate the imaging apparatus in the power saving state where it is difficult to see a display screen.

Therefore, as described above, it is inconvenient to a user in any cases.

In Japanese Patent number 4328697, in order to provide an imaging apparatus having a power saving function to avoid wasteful power consumption, an imaging apparatus is disclosed, including: a timer for an auto power off; a timer to change to a power saving mode (power saving state); an operating device to operate an imaging apparatus; and a detector to detect a change of posture of the imaging apparatus such that in a case where the operating device is operated, the timer for the auto power off and the timer to change to the power saving mode are reset, and in a case where the change of posture of the imaging apparatus is detected, only the timer to change to the power saving mode is reset. Thus, it is possible to suppress power consumption by having an auto power off function and the power saving function.

However, in Japanese Patent number 4328697, there is no specific detecting method of the change of posture, and the operability of the imaging apparatus is not efficiently improved. And, in addition, because the imaging apparatus has a plurality of timers, there is a problem of an increase in cost.

SUMMARY

An object of the present invention is to solve the above-described problems, and provide an imaging apparatus that is low-cost, has an excellent operability and a power saving function that avoids wasteful power consumption, an imaging method, and a program to execute the imaging method.

In order to achieve the above object, an embodiment of the present invention provides an imaging apparatus, comprising: an image sensor; an image obtainer that obtains a plurality of images from the image sensor; a posture detector that obtains posture information of the imaging apparatus; a posture information accumulating buffer that accumulates the posture information obtained by the posture detector; and a power saving mode setter that activates and deactivates a power saving mode in which power consumption is suppressed, wherein the power saving mode setter determines to activate and deactivate the power saving mode based on the accumulated posture information in the posture information accumulating buffer.

In order to achieve the above object, an embodiment of the present invention provides an imaging method, comprising: a step of obtaining images that obtains a plurality of images; a step of detecting posture that obtains posture information; a step of accumulating posture information that accumulates the posture information obtained in the step of detecting posture; and a step of setting a power saving mode that activates and deactivates the power saving mode in which power consumption is suppressed, wherein the step of setting the power saving mode determines to activate and deactivate the power saving mode based on the posture information accumulated in the step of accumulating posture information.

BRIEF DESCRIPTION OF THE DRAWINGS

FIG. 7 is a flow chart illustrating an operation process for power saving determination of a digital camera according to a second embodiment of the present invention.

DETAILED DESCRIPTIONS OF THE PREFERRED EMBODIMENTS

Figure 1:
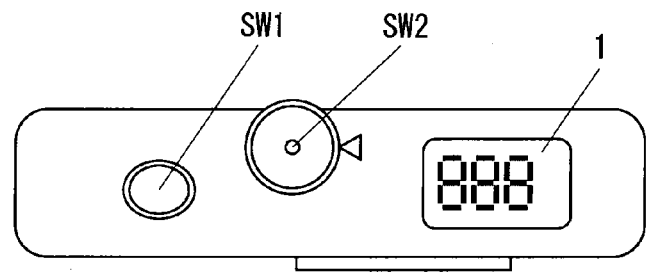
FIG. 1 is a schematic front view of a digital camera as an imaging apparatus according to an embodiment of the present invention.

According to embodiments of the present invention, an imaging apparatus includes: an image sensor; an image obtainer that obtains a plurality of images from the image sensor; a posture detector that obtains posture information of the imaging apparatus; a posture information accumulating buffer that accumulates the posture information obtained by the posture detector; and a power saving mode setter that activates and deactivates a power saving mode in which power consumption is suppressed, wherein the power saving mode setter determines to activate and deactivate the power saving mode based on the accumulated posture information in the posture information accumulating buffer.

In the embodiments of the present invention, in a case of determination of changing to a power saving mode (also referred to as power saving state) and returning from the power saving mode, an optimal power saving function is achieved without decreasing operability by using a limited buffer that accumulates posture data (posture information) of an imaging apparatus.

In the embodiments, a limited buffer is prepared as a posture information accumulating buffer, and sequentially, posture data of the imaging apparatus is obtained, and based on the data, determination as to whether there is a change in a posture of the imaging apparatus for a certain period or not is performed. If the buffer is full of data, the oldest data (oldest posture data) is deleted every time data (posture data) is obtained.

Determination of the change in the posture (motion detection) of the imaging apparatus is performed by use of a difference value between a maximum value and a minimum value of the data in the buffer. When the difference value is more than a threshold value, it is determined that there is a change in the posture (motion), and when the difference value is less than or equal to the threshold value, it is determined that there is no change in the posture (motion).

In the embodiments, by using the buffer, in a case where there is a motion of the imaging apparatus, it is possible to immediately detect the motion of the imaging apparatus, and therefore, it is possible to return from the power saving state immediately. In addition, only when there is no change in the posture (motion) of the imaging apparatus continuously for a certain period it is determined that there is no motion. Therefore, it is determined that there is motion for a certain period even after the motion is stopped, and for this period after there is motion, changing to the power saving state is not performed, there is no repeat of the power saving state and a normal state continuously, and it is possible to suitably control the power saving state.

Additionally, having a timer for changing to the power saving state is not needed for the imaging apparatus, and therefore, it is possible to achieve low cost. And in a case where the number of timers is limited, they can be used for another function.

Hereinafter, the imaging apparatus according to the embodiments of the present invention will be explained in detail with reference to the drawings.

[Imaging Apparatus (Digital Camera)]

Figure 2:
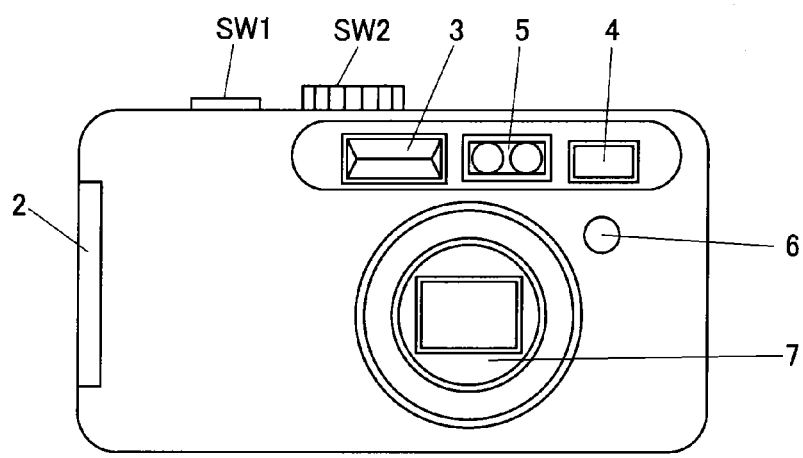
FIG. 2 is a schematic top view of the digital camera as the imaging apparatus according to the embodiment of the present invention.
Figure 3:
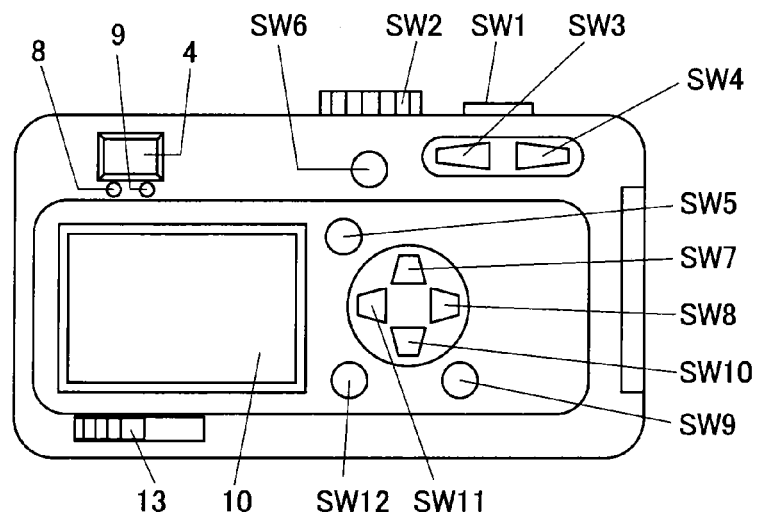
FIG. 3 is a schematic back view of the digital camera as the imaging apparatus according to the embodiment of the present invention.

FIGS. 1 to 3 are schematic diagrams of a digital camera as the imaging apparatus according to the embodiments of the present invention. FIG. 1 is a schematic front diagram, FIG. 2 is a schematic top diagram, and FIG. 3 is a schematic back diagram.

As illustrated in FIG. 1, on a top surface of the digital camera, a shutter button SW1, and a mode dial SW2 that performs switching of modes by a user are arranged. Additionally, a sub-LCD 1 is provided, which is controlled by a sub-CPU 109.

On a front surface of the digital camera, a lens barrel unit 7, a remote control light receiver 6, a distance metering unit 5, an optical viewfinder 4, and flash 3 are provided. The distance metering unit 5 is controlled by a CPU 104-3. The flash 3 is controlled by the CPU 104-3 via a flash circuit 114. On a side surface of the digital camera, an SD card/battery cover 2 is provided.

On a back surface of the digital camera, an LCD monitor 10, the optical view finder 4, an AF LED 8, a flash LED 9, and various switches SW3 to SW13 are provided. The various switches SW3 to SW13 receives operations from a user.

Next, with reference to FIG. 4, a system constitution of the digital camera will be explained in detail.

Figure 4:
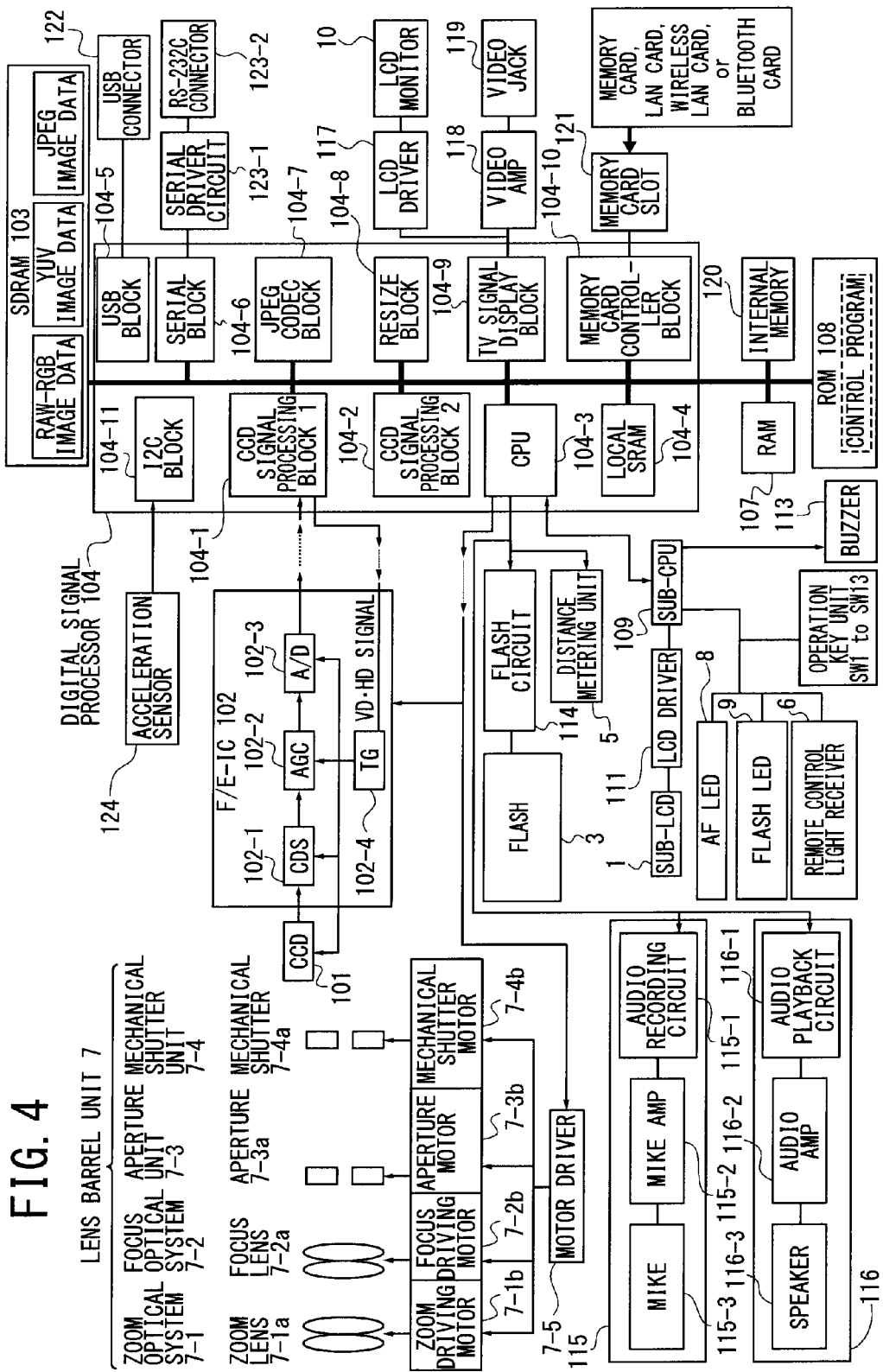
FIG. 4 is a block diagram illustrating a system constitution of the digital camera in FIGS. 1 to 3.

FIG. 4 is a schematic block diagram of the system constitution of the digital camera illustrated in FIGS. 1, 2, and 3.

The lens barrel unit 7 has a zoom optical system 7-1, a focus optical system 7-2, an aperture unit 7-3, a mechanical shutter unit 7-4, and a motor driver 7-5. The zoom optical system 7-1 includes a zoom lens 7-1a, and a zoom driving motor 7-1b. The focus optical system 7-2 includes a focus lens 7-2a, and a focus driving motor 7-2b. The aperture unit 7-3 includes an aperture 7-3a, and an aperture motor 7-3b. The mechanical shutter unit 7-4 includes a mechanical shutter 7-4a, and a mechanical shutter motor 7-4b. The motor driver 7-5 drives each motor. The motor driver 7-5 is controlled by a drive command from the CPU 104-3 in a digital signal processor 104, based on an input from the remote control light receiver 6, and an operation input of an operation key unit SW1 to SW 13.

In a ROM 108, a control program and a parameter for control written in code readable by the CPU 104-3 are stored. When the power is turned on, the program is loaded in a main memory (not illustrated). The CPU 104-3 controls operation of each part of the apparatus in accordance with the program, and necessary data for control and the like are temporarily stored in a RAM 107, and a local SRAM 104-4 in the digital signal processor 104. A rewritable flash ROM is used as the ROM 108, and therefore, it is possible to change the control program and the parameter for control, and it is easily possible to upgrade functions.

A CCD 101 is a solid-state image sensor that photoelectrically converts an optical image. An F/E (front-end)-IC 102 includes a CDS 102-1, an AGC 102-2, an A/D 102-3, and TG 102-4. The CDS 102-1 performs a correlated double sampling for noise reduction. The AGC 102-2 performs a gain control. The A/D 102-3 performs conversion to a digital signal. A vertical synchronization signal (hereinafter, referred to as VD) and a horizontal synchronization signal (hereinafter, referred to as HD) are supplied to the TG 102-4 by a CCD signal processing block1 104-1, and the TG 102-4 generates a drive timing signal of the CCD 101 and the F/E-IC 102 controlled by the CPU 104-3. A CMOS can be used as the image sensor.

The digital signal processor 104 has the CCD signal processing block1 104-1, a CCD signal processing block2 104-2, the CPU 104-3, the local SRAM 104-4, a USB block 104-5, a serial block 104-6, a JPEG codec block 104-7, a resize block 104-8, a TV signal display block 104-9, a memory card controller block 104-10, and an I2C block 104-11. The CCD signal processing block1 104-1 performs a white balance setting and a gamma setting on image data outputted from the CCD 101 via the F/E-IC 102, and, as described above, supplies the VD and the HD. The CCD signal processing block2 104-2 performs conversion to brightness data and color difference data by a filtering process. The CPU 104-3 controls operation of each part described of the apparatus. The local SRAM 104-4 temporarily stores data necessary for the above-described control and the like. The USB block 104-5 performs USB communication with an external device such as a PC or the like. The serial block 104-6 performs serial communication with an external device such as a PC or the like. The JPEG codec block 104-7 performs JPEG compression and decompression. The resize block 104-8 extends and reduces a size of image data by an interpolation process. The TV signal display block 104-9 performs conversion to a video signal to display image data on an external display device such as an LCD monitor or a TV. The memory card controller block 104-10 performs control of a memory card on which imaged image data (imaged image) is recorded. The I2C block 104-11 obtains an output signal of acceleration of the imaging apparatus detected by an acceleration sensor 124.

An SDRAM 103 temporarily stores image data, when various operations are performed on image data in the above-described digital signal processor 104. The stored image data (imaged image), for example, are RAW-RGB image data, YUV image data, and JPEG image data. The RAW-RGB image data is data on which the white balance setting and the gamma setting are performed in the CCD signal processing block1 104-1. The YUV image data is data on which the conversion to brightness data and color difference data is performed in the CCD signal processing block2 104-2. The JPEG image data is data on which the JPEG compression is performed in the JPEG codec block 104-7.

A memory card slot 121 is a slot in which a detachable memory card is inserted, and in which a LAN card, a wireless LAN card, or a Bluetooth card can be also inserted.

An internal memory 120 is a memory that stores imaged image data, even in a case where a memory card is not inserted in the memory card slot 121.

An LCD (Liquid Crystal Display) driver 117 is a drive circuit that drives the LCD monitor 10, and also has a function that converts a video signal outputted from the TV signal display block 104-9 to a signal to display on the LCD monitor 10.

The LCD monitor 10 is a monitor that is used for monitoring a state of a photographic subject before imaging (monitoring before pressing the shutter button), checking the imaged image, displaying image data recorded in a memory card or the above-described internal memory, or the like. A video AMP 118 is an amplifier that converts a video signal outputted from the TV display signal processor 104-3 to impedance of 75Ω. A video jack 119 is a jack that connects with an external display device such as a TV or the like.

A USB connector 122 is a connector that performs a USB connection with an external device such as a PC. A serial driver circuit 123-1 is a circuit that converts an output signal of the above-described serial block 104-6 in order to perform the serial communication with an external device such as a PC. An RS-232C connector 123-2 is a connector that performs a serial connection with an external device such as a PC. A sub-CPU 109 is a CPU in which a ROM and a RAM are included in one chip. The sub-CPU 109 outputs an output signal of the operation key unit SW1 to SW13 and the remote control light receiver 6 as operation information of a user to the CPU 104-3, and converts a state of the camera outputted from the CPU 104-3 to a control signal of the sub-LCD 1, the AF LED 8, the flash LED 9, and the buzzer 113, and outputs it.

The sub-LCD 1 is a display that displays the number of imagable images, and so on. The LCD driver 111 is a drive circuit that drives the sub-LCD 1 by an output signal of the sub-CPU 109.

The AF LED 8 is an LED that displays a focusing state when imaging. The flash LED 9 is an LED that displays a charging state of the flash 3. The AF LED 8 and the flash LED 9 can be used for another display usage such as "accessing memory card".

The operation key unit SW1 to SW13 is a key circuit operated by a user. A remote control light receiver 6 is a receiver of a signal of a remote controller operated by the user.

The flash 3 is driven by the flash circuit 114 by an output signal of the CPU 104-3 and emits light.

The distance metering unit 5 performs measurement of a distance to a photographic subject when imaging.

An audio recording unit 115 has a mike (microphone) 115-3, a mike AMP 115-2, and an audio recording circuit 115-1. An audio signal is inputted to the mike 115-3 by a user. The mike AMP 115-2 amplifies the inputted audio signal. The audio recording circuit 115-1 records the amplified audio signal.

An audio playback unit 116 has an audio playback circuit 116-1, an audio AMP 116-2, and a speaker 116-3. The audio playback circuit 116-1 converts the recorded audio signal to a signal that is capable of being outputted from the speaker. The audio AMP 116-2 amplifies the converted audio signal and drives the speaker. The speaker 116-3 outputs an audio signal.

The acceleration sensor 124 that is a posture detector is mounted on a PCB (Printed Circuit Board), and outputs data of two axes, X and Y, and temperature T. The acceleration sensor 124 calculates an inclination such as a roll angle, a pitch angle, or the like of the camera from those data, and displays it on the LCD monitor 10, or the like. A roll angle θ with respect to levelness of the acceleration sensor 124 is expressed by the following expression. In the following expression, G0 is an output at zero gravity.

$$\theta[\text{degree}]=180/\pi \times \arctan((Y0-G0)/(X0-G0))$$

When the camera is in a state of being illustrated in FIGS. 2 and 3, the roll angle θ of the camera is taken as 0 degrees, and when the LCD monitor 10 is inclined in the clockwise direction, an inclination is taken as a positive inclination, and when the LCD monitor 10 is inclined in the counterclockwise direction, an inclination is taken as a negative inclination.

A power saving mode is a function that changes a state of the camera to a state where power consumption is suppressed by decreasing brightness of display of the LCD monitor 10, or the like, in a case where the CPU 104-3 determines whether the camera is used or not by output information from the acceleration sensor 124 and it is determined that the camera is not used. By enabling the power saving mode, it is possible for a user to image more images with one-time charging.

First Embodiment

Figure 5:
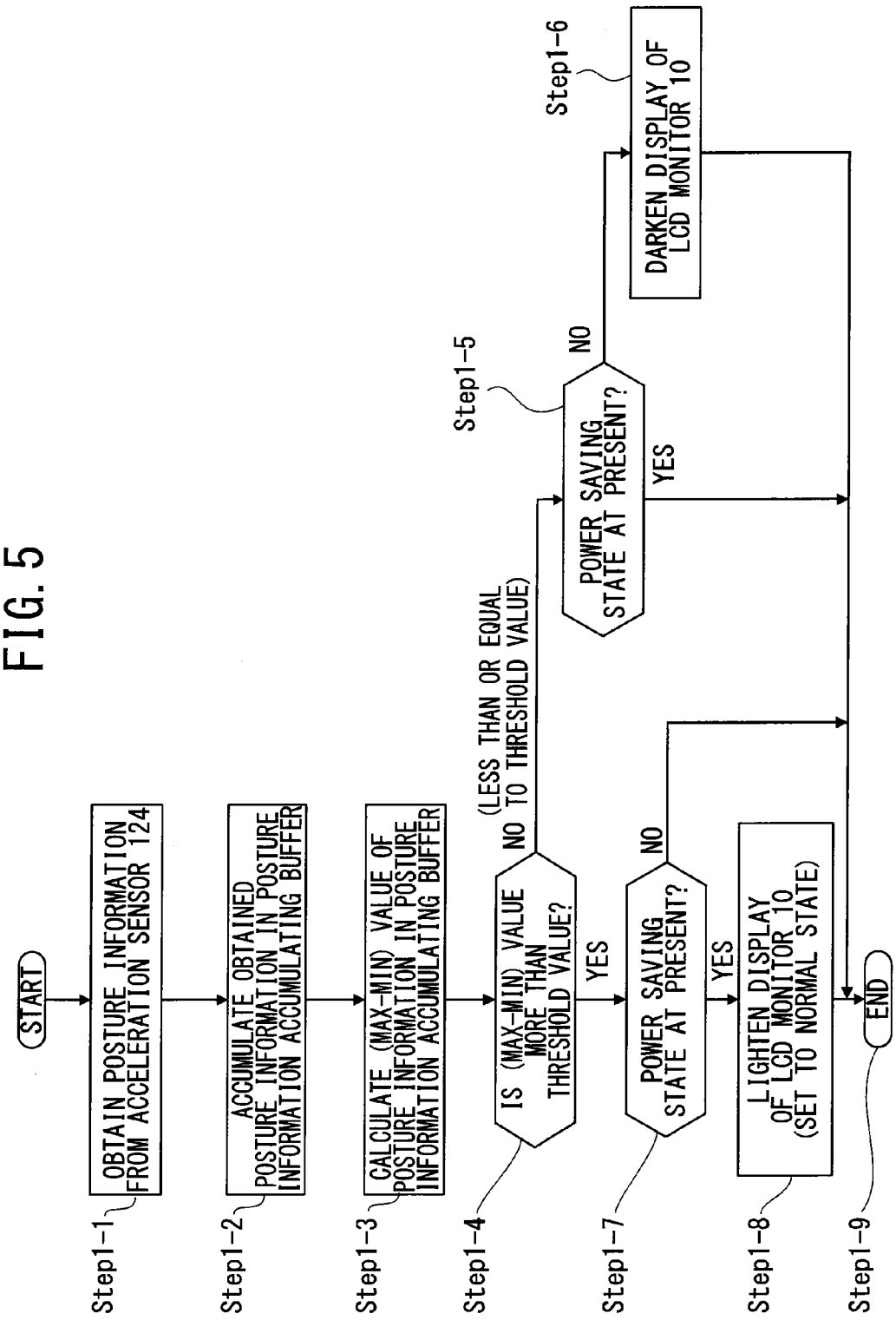
FIG. 5 is a flow chart illustrating an operation process for power saving determination of an imaging apparatus according to a first embodiment of the present invention.
Figure 6:
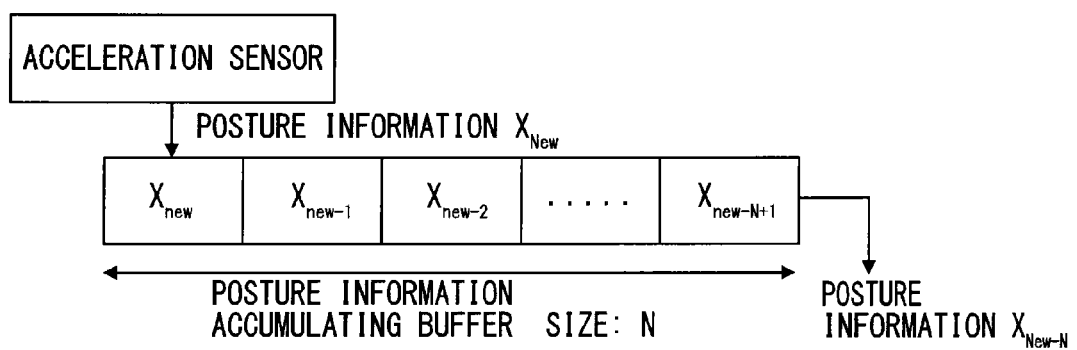
FIG. 6 is a flow chart illustrating an operation process in a case of obtaining posture information of the imaging apparatus according to the first embodiment of the present invention.

FIG. 5 is a flow chart illustrating an operation process of power saving determination according to a first embodiment of the present invention. FIG. 6 is a flow chart illustrating an operation process in a case of obtaining posture information according to the first embodiment of the present invention.

In a case where an imaged image is displayed on the LCD monitor 10 that is a display, it is possible to decrease power consumption (enable the power saving mode) by decreasing brightness of display. When there is no change in the posture of the camera, in many such cases, the camera is not used, and therefore, in the first embodiment of the present invention, the power saving mode is performed by decreasing brightness of display in a timing where there is no change in the posture of the camera.

When the power saving mode is on, in FIG. 5, firstly, the CPU 104-3 obtains posture data that is posture information of the camera at the time from the acceleration sensor 124 that is a posture detector (Step 1-1), and as illustrated in FIG. 6, the posture information that is obtained data is accumulated in a posture information accumulating buffer (Step 1-2).

The posture information accumulating buffer is limited, and accumulates an arbitrary amount of the posture data. In a case of accumulating the posture data, when the posture information accumulating buffer is full of previous data (already accumulated posture data), the posture data obtained first in the posture information accumulating buffer is deleted, and new posture data is added to the posture information accumulating buffer.

When accumulation of the data in the posture information accumulating buffer is completed, the CPU 104-3 calculates a difference value between a maximum value and a minimum value of the data in the posture information accumulating buffer (Step 1-3).

It is determined whether the calculated difference value is more than a threshold value for performing power saving (up to the threshold value, power saving is performed.) or not (Step 1-4). In a case where it is determined that the calculated difference value is less than or equal to the threshold value, the CPU 104-3 determines that power saving should be performed, and determines whether the camera is in a power saving state (power saving mode) or not at present (Step 1-5). In a case where the camera is not in the power saving state, the CPU 104-3 sets the camera to the power saving state, and the brightness of display of the LCD monitor 10 is decreased compared to a normal state and display of the LCD monitor 10 is darkened (Step 1-6), and determination of power saving is finished (Step 1-9). On the other hand, in a case where the camera is in the power saving state, the brightness of display of the LCD monitor 10 continues to be decreased compared to the normal state and the display of the LCD monitor 10 continues to be darkened, and the determination of power saving is finished (Step 1-9).

In a case where it is determined that the calculated difference value is more than the threshold value for performing power saving, the CPU 104-3 determines that power saving should not be performed, and determines whether the camera is in the power saving state (power saving mode) or not at present (Step 1-7). In a case where the camera is in the power saving state, the CPU 104-3 cancels the power saving state, and the brightness of display of the LCD monitor 10 is increased to the same amount as that in the normal state and the display of the LCD monitor 10 is lightened (Step 1-8), and the determination of power saving is finished (Step 1-9). On the other hand, in a case where the camera is not in the power saving state, the brightness of display of the LCD monitor 10 continues to be the same amount as that in the normal state and the LCD monitor 10 continues to be lightened, and the determination of power saving is finished (Step 1-9).

Second Embodiment

FIG. 7 is a flow chart illustrating an operation process of determination of power saving according to a second embodiment of the present invention.

When a frame rate of monitoring is decreased, the number of photoelectrical conversions of an imaging object from the CCD 101 is decreased. Thus, it is possible to decrease power consumption. That is, in a case where a plurality of imaged images is continuously obtained from the CCD 101 that is an image sensor, it is possible to decrease power consumption by lengthening a duration for obtaining the image images.

When there is no change in the posture of the camera, it is considered that there is less change of the imaging object, and therefore, in the second embodiment of the present invention, the power saving mode is performed by decreasing the frame rate of monitoring in a timing where there is no change in the posture of the camera.

When the power saving mode is on, in FIG. 7, firstly, the CPU 104-3 obtains posture data that is posture information of the camera at the time from the acceleration sensor 124 that is the posture detector (Step 2-1), and similar to the above-described first embodiment, as illustrated in FIG. 6, the posture information that is obtained data is accumulated in the posture information accumulating buffer (Step 2-2).

When accumulation of the data in the posture information accumulating buffer is completed, the CPU 104-3 calculates a difference value between a maximum value and a minimum value of the data in the posture information accumulating buffer (Step 2-3).

It is determined whether the calculated difference value is more than a threshold value for performing power saving (up to the threshold value, power saving is performed.) or not (Step 2-4). In a case where it is determined that the calculated difference value is less than or equal to the threshold value, the CPU 104-3 determines that power saving should be performed, and determines whether the camera is in a power saving state (power saving mode) or not at present (Step 2-5). In a case where the camera is not in the power saving state, the CPU 104-3 sets the camera to the power saving state, and the frame rate of monitoring is decreased compared to a normal state (Step 2-6), and determination of power saving is finished (Step 2-9). On the other hand, in a case where the camera is in the power saving state, the frame rate of monitoring remains the same as that in the power saving state, and the determination of power saving is finished (Step 2-9).

In a case where it is determined that the calculated difference value is more than the threshold value for performing power saving, the CPU 104-3 determines that power saving should not be performed, and determines whether the camera is in the power saving state (power saving mode) or not at present (Step 2-7). In a case where the camera is in the power saving state, the CPU 104-3 cancels the power saving state, and the frame rate of monitoring is increased to the same as that in the normal state (Step 2-8), and the determination of power saving is finished (Step 2-9). On the other hand, in a case where the camera is not in the power saving state, the frame rate of monitoring remains the same as that in the normal state, and the determination of power saving is finished (Step 2-9).

According to the above-described first and second embodiments of the present invention, it is possible to provide a power saving function that is low in cost, has excellent operability, and avoids wasteful power consumption.

Note that in the above-described first and second embodiments of the present invention, the CPU 104-3 corresponds to a brightness of display changer. The CPU 104-3, the acceleration sensor 124, and the I2C block 104-11 are included in a power saving mode setter. The lens barrel unit 7, the F/E-IC 102, and the digital signal processor 104 are included in an image obtainer. The CPU 104-3 corresponds to an image obtaining duration changer.

[Program]

In each embodiment of the imaging apparatus according to the present invention described above, a program to execute the operation illustrated by a flow chart configures a program according to the present invention. The program can be stored on a recording medium. For example, a semiconductor memory, an optical memory and/or a magnetic memory can be used as the recording medium. By use of the recording medium, it is possible to install the program in a computer. The recording medium storing the program can be a non-transitory computer-readable recording medium.

Thus, although the preferred embodiments of the present invention have been explained specifically, they are not limited to the above-described imaging apparatus, imaging method, program, and recording medium, and it should be appreciated that variations may be made without departing from the scope of the present invention.

According to an embodiment of the present invention, it is possible to provide an imaging apparatus that is low in cost, has excellent operability and a power saving function that avoids wasteful power consumption, an imaging method, and a program to execute the imaging method.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus comprising:
an image sensor;
an image obtainer that obtains a plurality of images from the image sensor;
a posture detector that obtains posture information of the imaging apparatus;
a posture information accumulating buffer that accumulates plural items of posture information obtained by the posture detector; and
a power saving mode setter that activates and deactivates a power saving mode in which power consumption is suppressed,
wherein the power saving mode setter determines to activate and deactivate the power saving mode based on a value corresponding to the plural items of accumulated posture information in the posture information accumulating buffer, and wherein the activation and the deactivation of the power saving mode is determined based on a difference value between a maximum value and a minimum value of the plural items of accumulated posture information in the posture information accumulating buffer,
wherein previously accumulated posture data in the posture information accumulating buffer is deleted and new posture data is added to the posture information accumulating buffer, when the posture information accumulating buffer is full of the previously accumulated posture data.

2. The imaging apparatus according to claim 1, further comprising:
a display that displays the image obtained by the image sensor; and
a display brightness changer that changes brightness of the display,
wherein the display brightness changer changes the brightness of the display when the power saving mode is activated or deactivated.

3. The imaging apparatus according to claim 1, further comprising:
an image obtaining duration changer that changes a duration for obtaining the image from the image sensor by the image obtainer,
wherein the image obtaining duration changer changes the duration when the power saving mode is activated or deactivated.

4. An imaging method comprising:
a step of obtaining images that obtains a plurality of images;
a step of detecting posture that obtains posture information;
a step of accumulating plural items of posture information obtained in the step of detecting posture; and
step of setting a power saving mode that activates and deactivates the power saving mode in which power consumption is suppressed,
wherein the step of setting the power saving mode determines to activate and deactivate the power saving mode based on a value corresponding to the plural items of posture information accumulated in the step of accumulating posture information,
wherein the activation and the deactivation of the power saving mode is determined based on a difference value between a maximum value and a minimum value of the plural items of accumulated posture information in the step of accumulating posture information,
further comprising steps of deleting previously accumulated posture data in the posture information accumulating buffer and adding new posture data to the posture information accumulating buffer, when the posture information accumulating buffer is full of the previously accumulated posture data.

5. The imaging method according to claim 4, further comprising:
a step of displaying that displays the image; and
a step of changing display brightness that changes brightness of the display,
wherein the step of changing the display brightness changes the brightness of the display when the power saving mode is activated or deactivated.

6. The imaging method according to claim 4, further comprising:
a step of changing an image obtaining duration that changes a duration for obtaining the image, wherein the step of changing the image obtaining duration changes the duration when the power saving mode is activated or deactivated.

7. A non-transitory computer-readable recording medium storing a program to execute the imaging method according to claim 4.

8. The imaging apparatus according to claim 1, wherein said determination of the activation and the deactivation of the power saving mode based on a difference value between a maximum value and a minimum value of the plural items of accumulated posture information in the posture information accumulating buffer comprises comparing the difference value with a predetermined threshold value.

9. The imaging method according to claim 4, wherein said determination of the activation and the deactivation of the power saving mode based on a difference value between a maximum value and a minimum value of the plural items of accumulated posture information in the posture information accumulating buffer comprises comparing the difference value with a predetermined threshold value.

* * * * *